United States Patent
Sharma et al.

(10) Patent No.: US 10,452,138 B1
(45) Date of Patent: Oct. 22, 2019

(54) SCANNING RETINAL IMAGING SYSTEM FOR CHARACTERIZATION OF EYE TRACKERS

(71) Applicant: Facebook Technologies, LLC, Menlo Park, CA (US)

(72) Inventors: Robin Sharma, Redmond, WA (US); Nicholas Daniel Trail, Bothell, WA (US); Robert Dale Cavin, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 101 days.

(21) Appl. No.: 15/881,289

(22) Filed: Jan. 26, 2018

Related U.S. Application Data

(60) Provisional application No. 62/452,258, filed on Jan. 30, 2017.

(51) Int. Cl.
  *G06F 3/01* (2006.01)
  *G02B 27/01* (2006.01)
  (Continued)

(52) U.S. Cl.
  CPC .............. *G06F 3/013* (2013.01); *G01M 11/00* (2013.01); *G02B 27/0093* (2013.01);
  (Continued)

(58) Field of Classification Search
  CPC .... G06F 3/013; H04N 9/3161; H04N 9/3155; H04N 9/3173; G02B 27/017;
  (Continued)

(56) References Cited

U.S. PATENT DOCUMENTS

| 2009/0316115 A1* | 12/2009 | Itoh ..................... G02B 27/0093 353/20 |
| 2010/0053555 A1* | 3/2010 | Enriquez ................ A61B 3/113 351/210 |

(Continued)

OTHER PUBLICATIONS

Sheehy, C. et al., "High-Speed, Image-Based Eye Tracking with a Scanning Laser Ophthalmoscope," Biomedical Optics Express, Oct. 2012, pp. 2611-2622, vol. 3, No. 10.

(Continued)

*Primary Examiner* — Darlene M Ritchie
(74) *Attorney, Agent, or Firm* — Fenwick & West LLP

(57) ABSTRACT

An eye tracker characterization system comprising a scanning retinal imaging unit and a controller. The scanning retinal imaging unit characterizes eye tracking information determined by an eye tracking unit under test. The scanning retinal imaging unit includes a scanning optics assembly and a detector. The scanning optics assembly scans light in a first band across a retinal region of an eye of a user. The detector detects the scanned light reflected from the retinal region. The controller selects eye tracking information received from the eye tracking unit under test and corresponding eye tracking parameters received from the scanning retinal imaging unit. The controller calculates differences between the selected eye tracking information and the corresponding selected eye tracking parameters, and characterizes the selected eye tracking information based on the calculated differences.

20 Claims, 6 Drawing Sheets

(51) Int. Cl.
*G01M 11/00* (2006.01)
*H04N 9/31* (2006.01)
*G02B 6/35* (2006.01)
*G02B 27/00* (2006.01)

(52) U.S. Cl.
CPC ....... *G02B 27/0172* (2013.01); *H04N 9/3155* (2013.01); *H04N 9/3161* (2013.01); *H04N 9/3173* (2013.01); *G02B 6/3586* (2013.01); *G02B 2027/0138* (2013.01)

(58) Field of Classification Search
CPC ............ G02B 27/0172; G02B 27/0093; G02B 27/01; G02B 27/0101; G02B 27/0107; G02B 27/0138; G02B 27/014; G02B 6/3586; G02F 1/1309; G09G 3/006; G01M 11/00
See application file for complete search history.

(56) References Cited

U.S. PATENT DOCUMENTS

| | | | |
|---|---|---|---|
| 2011/0307216 A1* | 12/2011 | Lindquist | G02B 27/0093 702/182 |
| 2012/0105486 A1* | 5/2012 | Lankford | G06F 3/013 345/661 |
| 2012/0147326 A1* | 6/2012 | Yatagai | A61B 3/102 351/206 |
| 2013/0178287 A1* | 7/2013 | Yahav | G02B 27/01 463/32 |
| 2014/0055337 A1* | 2/2014 | Karlsson | G06F 3/013 345/156 |
| 2014/0098198 A1* | 4/2014 | Lee | H04N 13/246 13/246 |
| 2014/0163329 A1* | 6/2014 | Brown, Jr. | A61B 3/113 600/301 |
| 2014/0361996 A1* | 12/2014 | Eden | G06F 3/013 345/173 |
| 2015/0331485 A1* | 11/2015 | Wilairat | G02B 27/0172 345/156 |
| 2016/0134863 A1* | 5/2016 | Horesh | H04N 17/002 348/78 |
| 2016/0139665 A1* | 5/2016 | Lopez | G06F 3/013 345/156 |
| 2016/0216761 A1* | 7/2016 | Klingstrom | B60K 37/06 |
| 2016/0342205 A1* | 11/2016 | Shigeta | A61B 3/113 |
| 2017/0065171 A1* | 3/2017 | Satake | A61B 3/102 |
| 2019/0094981 A1* | 3/2019 | Bradski | H04N 13/204 |
| 2019/0129501 A1* | 5/2019 | Nistico | G06K 9/0061 |

OTHER PUBLICATIONS

Yang Y. et al., "Assessing Sodium Iodate Induced Outer Retinal Changes in Rats Using Confocal Scanning Laser Ophthalmoscopy and Optical Coherence Tomography," Invest. Ophthalmol. Vis. Sci. 2014, pp. 1696-1705, vol. 55, No. 3.

Yang, Q. et al., "Design of an Integrated Hardware Interface for AOSLO Image Capture and Cone-Targeted Stimulus Delivery," Optics Express, Aug. 16, 2010, pp. 17841-17858, vol. 18, No. 17.

* cited by examiner

500

Instruct A Display Unit To Project Content Onto A User's Eye
510

Activate An Eye Tracking Unit Under Test And A Scanning Retinal Imaging Unit
520

Select Eye Tracking Information Received From The Eye Tracking Unit And Corresponding Eye Tracking Parameters Received From The Scanning Retinal Imaging Unit
530

Calculate differences between each of the selected eye tracking information and each of corresponding selected eye tracking parameters
540

Characterize Each Of The Selected Eye Tracking Information Based On The Calculated Differences
550

FIG. 5

SCANNING RETINAL IMAGING SYSTEM FOR CHARACTERIZATION OF EYE TRACKERS

CROSS REFERENCE TO RELATED APPLICATION

This application claims the benefit of priority to U.S. Provisional Application No. 62/452,258, filed on Jan. 30, 2017, which is incorporated herein in its entirety for all purposes.

BACKGROUND

The present disclosure generally relates to characterizing eye trackers, and specifically relates to a scanning retinal imaging system for characterization of eye trackers.

Eye tracking refers to the process of detecting the direction of a user's gaze, which may comprise detecting the angular orientation of the user's eye in three-dimensional space. Eye tracking may further comprise detecting the location of the eye (e.g., the center of the eye), the torsion (i.e., the roll of the eye about the pupillary axis) of the eye, the shape of the eye, the current focal distance of the eye, the dilation of the pupil, other features of the eye's state, or some combination thereof.

Eye tracking is an important feature for head-mounted display (HMD) systems including systems used in virtual reality (VR) applications, an artificial reality (AR) application, a mixed reality (MR) applications, or some combination thereof Conventional eye tracking systems track features on anterior surface of a human eye and are typically limited by a quality of optical paths in the eye tracking systems, limited modeling of variance of eye features across a human population, and limitations of algorithms to overcome these complications. To advance beyond these limitations, a source of 'ground truth' eye tracking data is needed.

SUMMARY

An eye tracker characterization system for characterizing eye tracking information determined by an eye tracking unit under test. The eye tracker characterization system comprising a scanning retinal imaging unit and a controller. The scanning retinal imaging unit includes a scanning optics assembly and a detector. The scanning optics assembly scans light in a first band across a retinal region of an eye of a user. The detector detects the scanned light reflected from the retinal region. The controller is coupled to the eye tracking system under test and the scanning retinal imaging unit. The controller selects eye tracking information received from the eye tracking unit under test and a corresponding eye tracking parameter received from the scanning retinal imaging unit. The controller calculates a difference between the selected eye tracking information and the corresponding selected eye tracking parameter. The controller characterizes the selected eye tracking information based on the calculated difference.

One embodiment is a method for characterizing eye tracking information determined by an eye tracking unit under test. Eye tracking information received from an eye tracking unit under test and a corresponding eye tracking parameter received from a scanning retinal imaging unit are selected. A difference is calculated between the selected eye tracking information and the corresponding selected eye tracking parameter. The selected eye tracking information is characterized based on the calculated differences.

One embodiment of a non-transitory computer-readable medium storing executable instructions for characterizing eye tracking information determined by an eye tracking unit under test. Eye tracking information received from an eye tracking unit under test and a corresponding eye tracking parameter received from a scanning retinal imaging unit are selected. A difference is calculated between the selected eye tracking information and the corresponding selected eye tracking parameter. The selected eye tracking information is characterized based on the calculated differences.

BRIEF DESCRIPTION OF THE DRAWINGS

FIG. 5 is a flowchart illustrating a process of characterizing performance of an eye tracking unit under test using an eye tracker characterization system, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Head-Mounted Display Overview

Figure 1A:
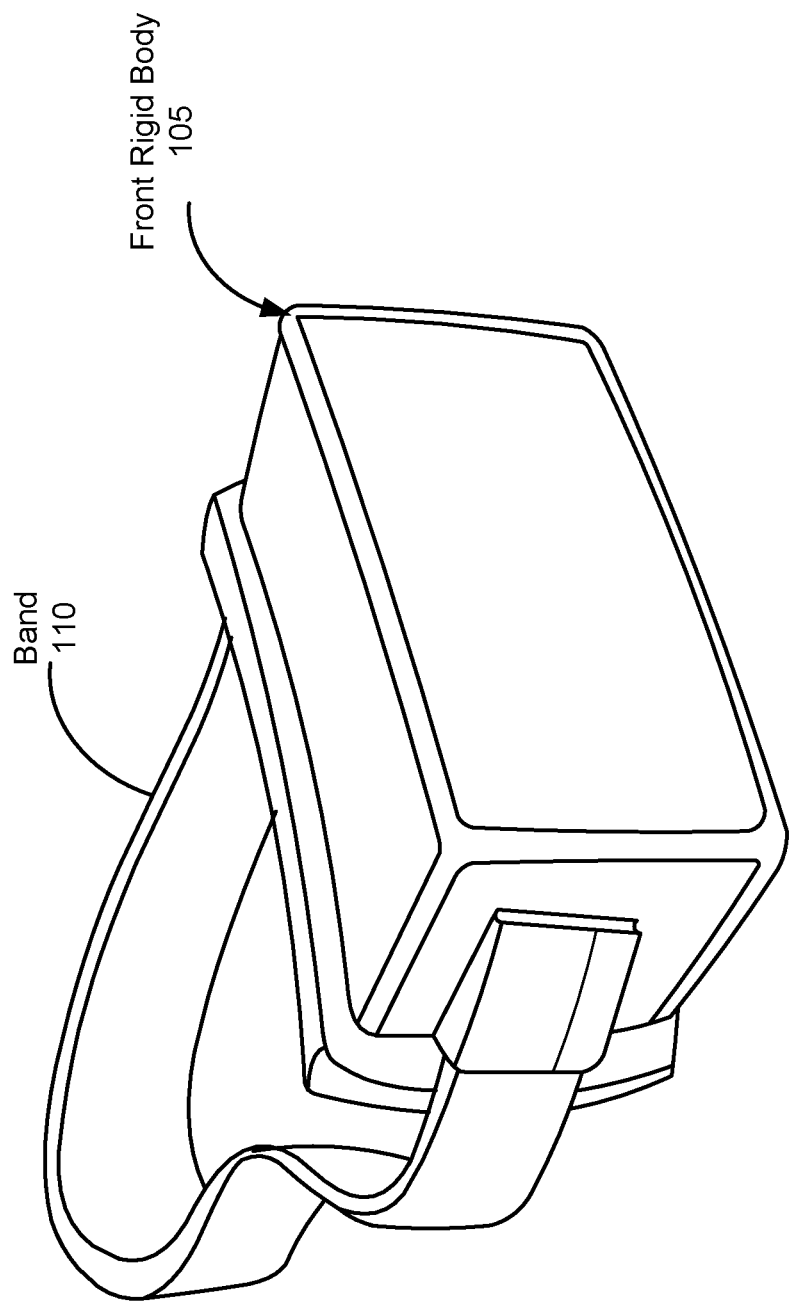
FIG. 1A is a diagram of a head-mounted display, in accordance with an embodiment.

FIG. 1A is a diagram of a head-mounted display (HMD) 100, in accordance with an embodiment. The HMD 100 includes a front rigid body 105 and a band 110. The front rigid body 105 includes an electronic display element of an electronic display (not shown in FIG. 1A), an optics block (not shown in FIG. 1A), and an eye tracking unit (not shown in FIG. 1A). The eye tracking unit (also referred to eye tracker) is discussed in detail below with regard to, e.g., FIG. 2. In some embodiments, the HMD 100 may act as a virtual reality (VR) headset, an augmented reality (AR) headset, a mixed reality (MR) headset, or some combination thereof. In embodiments that describe AR system environment, the HMD 100 augments views of a physical, real-world environment with computer-generated elements (e.g., images, video, sound, etc.). For example, one or more portions the HMD 100 may be at least partially transparent. In embodiments that describe MR system environment, the HMD 100 merges views of physical, real-word environment with virtual environment to produce new environments and visualizations where physical and digital objects co-exist and interact in real time.

Figure 1B:
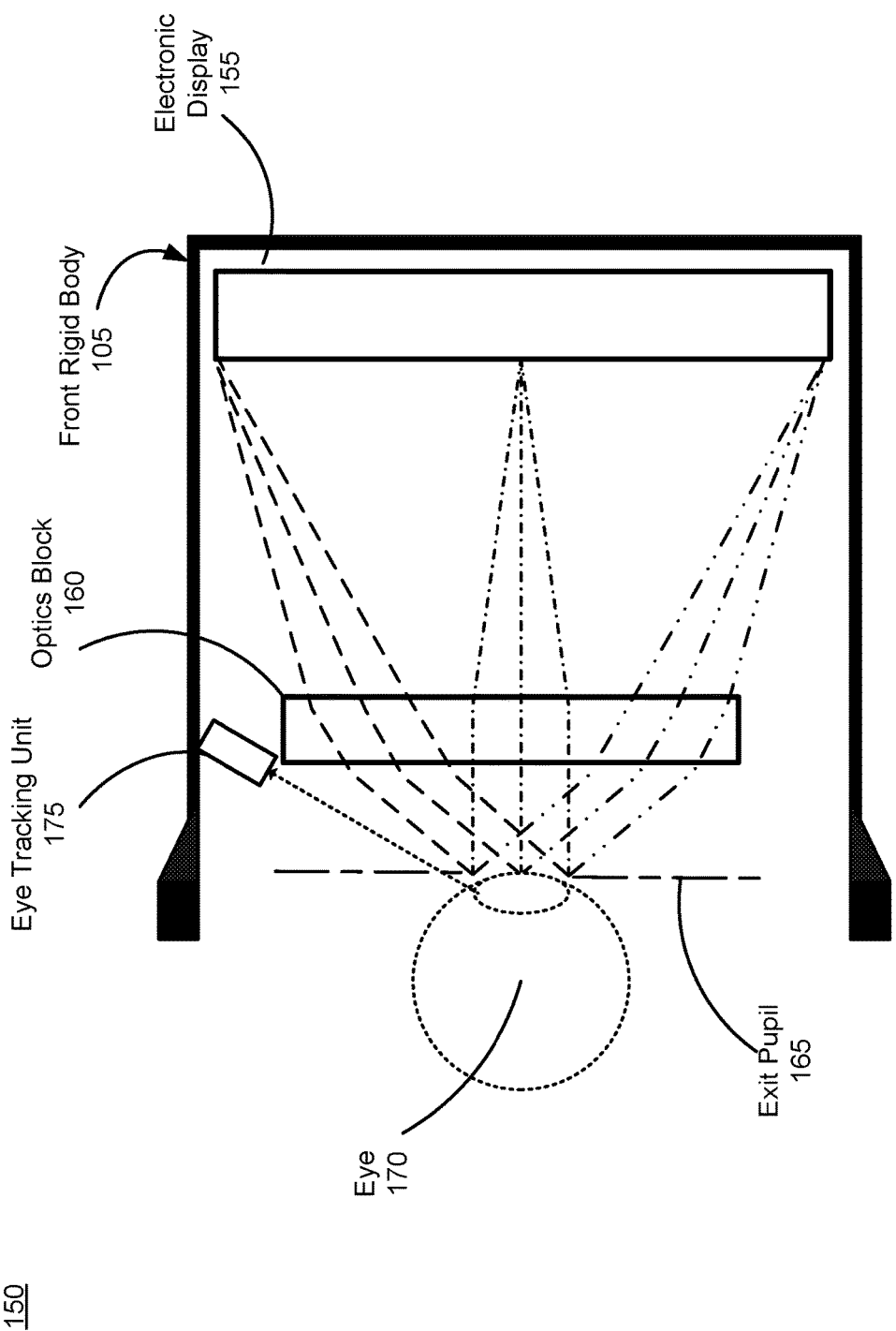
FIG. 1B is a cross section of a front rigid body of the head-mounted display in FIG. 1A, in accordance with an embodiment.

FIG. 1B is a cross section 150 of the front rigid body 105 of the HMD 100 in FIG. 1A, in accordance with an embodiment. As shown in FIG. 1B, the front rigid body 105 includes an electronic display 155 and an optical block 160 that together provide image light to an exit pupil 165. The exit pupil 165 is a location of the front rigid body 105 where a user's eye 170 is positioned. For purposes of illustration, FIG. 1B shows a cross section 150 associated with a single eye 170, but a separate optical block 160, and/or electronic display element 155 may provide altered image light to another eye of the user. Additionally, the HMD 100 includes an eye tracking unit 175. The eye tracking unit 175 may include, e.g., one or more sources that illuminate one or both eyes of the user, and one or more detectors that capture images of one or both eyes of the user.

The electronic display 155 displays images to the user. In various embodiments, the electronic display 155 may comprise a single electronic display or multiple electronic displays. Examples of the electronic display 155 include: a liquid crystal display (LCD), an organic light emitting diode (OLED) display, an active-matrix organic light-emitting diode display (AMOLED), a quantum organic light emitting diode (QOLED) display, a quantum light emitting diode (QLED) display, a transparent organic light emitting diode (TOLED) display, some other display, or some combination thereof.

The optics block 160 magnifies received light from the electronic display 155, corrects optical errors associated with the image light, and the corrected image light is presented to a user of the HMD 100. The optics block is an optical element, such as an aperture, a Fresnel lens, a convex lens, a concave lens, a filter, or any other suitable optical element that directs the light emitted from the electronic display 155 towards the user. Moreover, the optics block 160 may include combinations of different optical elements. In some embodiments, one or more of the optical elements in the optics block 160 may have one or more coatings, such as partial reflectors or anti-reflective coatings.

Magnification of the image light by the optics block 160 allows the electronic display 155 to be physically smaller, weigh less, and consume less power than larger displays. Additionally, magnification may increase a field of view of the displayed content. For example, the field of view of the displayed content is such that the displayed content is presented using almost all (e.g., 110° diagonal), and in some cases all, of the user's instantaneous field of view. In some embodiments, the optics block 160 is designed so its effective focal length is larger than the spacing to the electronic display 155, which magnifies the image light projected by the electronic display 155. Additionally, in some embodiments, the amount of magnification may be adjusted by adding or removing optical elements.

The optics block 160 may be designed to correct one or more types of optical error. Examples of optical error include: distortion, chromatic aberration, spherical aberration, field curvature, astigmatism, or any other type of optical aberrations. In some embodiments, content provided to the electronic display 155 for display is pre-distorted, and the optics block 160 corrects the distortion when it receives image light from the electronic display 155 generated based on the content.

The eye tracking unit 175 tracks a user's eye movement (in up to six (6) degrees-of-freedom). Some or all of the eye tracking unit may or may not be in a line of sight of a user wearing the HMD 100. The eye tracking unit 175 is typically located off-axis to avoid obstructing the user's view of the electronic display 155, although the eye tracking unit may alternately be placed elsewhere. Also, in some embodiments, there is at least one eye tracking unit 175 for the user's left eye and at least one eye tracking unit for the user's right eye. In some embodiments, only one eye tracking unit 175 may track both the left and right eye of the user.

The eye tracking unit 175 uses the tracked eye movement to determine eye tracking information. Eye tracking information describes a position (may describe orientation) of an eye 170 of the user. The eye tracking unit 175 may use the determined eye tracking information to further estimate eye tracking values, such as a gaze direction (also referred to a direction of a fovea axis that is an axis that bisects a center of a fovea and a center of an eye's pupil), a gaze position (also referred to as an fixation point where the user is looking), and gaze time (how long the user is looking a particular direction), a vergence angle (an angle between two eyes when the user changes viewing distance and gaze direction), an inter-pupillary distance (IPD, defined as the distance between the center of the pupils of the two eyes) of the user, an identification of the user, an eye's torsional state, eye's shape, some other function based on position of one or both eyes, or some combination thereof. Determined eye tracking values can then be included in the eye tracking information. For example, the eye tracking unit 175 can determine IPD by estimating eye position when the user is focused at infinity or, e.g., another object far from the user. In another example, the eye tracking unit 175 determines vergence angle by estimating changes of a user's viewing distance and gaze direction. The eye tracking unit 175 is also able to determine the eye's torsional state by estimating eye's rotation about a pupillary axis. In some embodiments, the eye tracking unit 175 is able to determine the foveal axis, the orientation of the foveal axis from a pupillary axis, and a change in the shape of the eye 170.

In one embodiment, the eye tracking unit 175 may estimate different types of eye movements based on the detected characterization parameters. For example, if the eye tracking unit 175 detects a user looks at a same location for at least a threshold time, the eye tracking unit 174 determines the user's eye 170 fixed on a particular point. If the eye tracking unit 175 detects the user rapidly shifting orientation back and forth between two points of fixation, the eye tracking unit 175 determines the user's eye movement is a saccade (e.g., may occur while reading, thinking, etc.). If the eye tracking unit 175 detects the user shifting orientation regularly for at least a threshold time, the eye tracking unit 175 determines the user' eye movement is smooth pursuit (e.g., following a moving object).

The eye tracking unit 175 may include one or more illumination sources, one or more imaging devices, and an eye tracking controller. The illumination source (also referred to as illuminator) illuminates a portion of a user's eye 170 with light. The predetermined illumination power is less than a threshold that causes injury to the eye. The illumination source may be an infrared light source. Examples of infrared light sources include: a laser (e.g., a tunable laser, a continuous wave laser, a pulse laser, other suitable laser emitting infrared light), a light emitted diode (LED), a fiber light source, another other suitable light source emitting infrared and/or visible light, or some combination thereof. In various embodiments, the illumination source may emit visible or near-infrared light. In some embodiments, the light emitted from the one or more illumination sources is a structured light pattern. In some embodiments, a portion of the eye 170 to be illuminated by the illumination source is selected for easy detection, due to an obvious change between the signal from the illuminated portion and other signals surrounding the illuminated portion during eye movement. For example, the illuminated portion may have a maximum contrast, e.g., a position with strongest back-reflection or backscattering from the edge of the user's sclera or cornea surface. The illuminated portion may be located on, e.g., an edge of the sclera, surface of the cornea, a limbus (e.g., junction of the cornea and sclera, a junction of the iris and the sclera, a junction of the iris and pupil, or any other suitable junction in the eye).

An imaging device detects reflected and/or scattered light from the illuminated portion of the eye 170. The imaging device outputs a detection signal proportional to the detected light. The detection signal corresponds to a reflectance of the illuminated portion of the eye which correlates with an apparent contrast change (e.g., a contrast change of corneal reflection) through the illuminated portion of the user's eye 170. In an embodiment, the imaging device comprises a camera configured to capture images of the illuminated portion of the eye. In some embodiments, the detector may be based on single-point detection (e.g., photodiode, balanced/matched photodiodes, or avalanche photodiode, or photomultiplier tube), or based on one or two-dimensional detector arrays (e.g., a camera, linear photodiode array, CCD array, or CMOS array). In some embodiments, the eye tracking unit 175 may include multiple detectors to capture light reflected from one or more illuminated portions of the eye 170.

The eye tracking controller determines eye tracking information based on captured light (e.g., a captured image) from the one or more imaging devices. In some embodiments, the eye tracking controller may compare captured light information (e.g., reflections of the eye 170, distortions of a structured light pattern projected onto the eye 170) with a predetermined lookup table or a predetermined eye model to estimate eye tracking information of the eye 170. A predetermined lookup table or a predetermined eye model describes the relation between captured light information and eye tracking information. For example, in some embodiments, the eye tracking controller identifies locations of reflections of light from the one or more illumination sources in a captured image of the eye of the user 170, and determines eye tracking information based on a comparison between shapes and/or locations of the identified reflections and a predetermined look-up table (or a predetermined eye model). Or, in cases where the eye 170 is illuminated with a structured light pattern, the eye tracking controller can detect distortions of the structured light pattern projected onto the eye 170, and estimate eye tracking information based on a comparison between the detected distortions and the predetermined look-up table (or a predetermined eye model). The eye tracking controller may use eye tracking information to further estimate other eye tracking values, e.g., a pupillary axis, a gaze angle (e.g., corresponds to a foveal axis), a translation of the eye 170, a torsion of the eye 170, and a current shape of the eye 170. Determined eye tracking values can then be included in the eye tracking information.

Based on the determined eye tracking information, the HMD 100 may adjust presentation of one or more images displayed on the electronic display 155. In one embodiment, the HMD 100 may adjust resolution of the displayed image(s) based on the eye tracking information. A maximum pixel density for displaying the image(s) on the electronic display 155 can be provided only in a foveal region of the determined eye-gaze, whereas a lower resolution display is employed in other regions, without negatively affecting the user's visual experience. In another embodiment, the HMD 100 may adjust focus of the displayed image(s) such that the displayed image(s) are in focus at the determined eye-gaze location, which also mitigates vergence-accommodation conflict (VAC) of image light propagating towards the user's eye 170. The HMD 100 may perform various other applications based at least in part on the determined eye tracking information. The applications include, but are not limited to, providing user interfaces (e.g., gaze-based selection), attention estimation (e.g., for user safety), different gaze-contingent display modes (e.g., synthetic depth of field rendering), metric scaling for depth and parallax correction (e.g., IPD and eye-box adjustment), etc.

Performance of the eye tracking unit 175 may be characterized before incorporating the eye tracking unit 175 into the HMD 100. Embodiments of the present disclosure support characterizing performance of the eye tracking unit 175 prior to being incorporated into a HMD, e.g., the HMD 100. As discussed in detail below with regard to FIGS. 2-4, characterization of the eye tracking unit 175 is performed by a scanning retinal imaging system that captures images of content presented on a retina of an eye, thus providing the "ground truth" for eye tracking information.

Characterizing Performance of an Eye Tracking Unit

Figure 2:
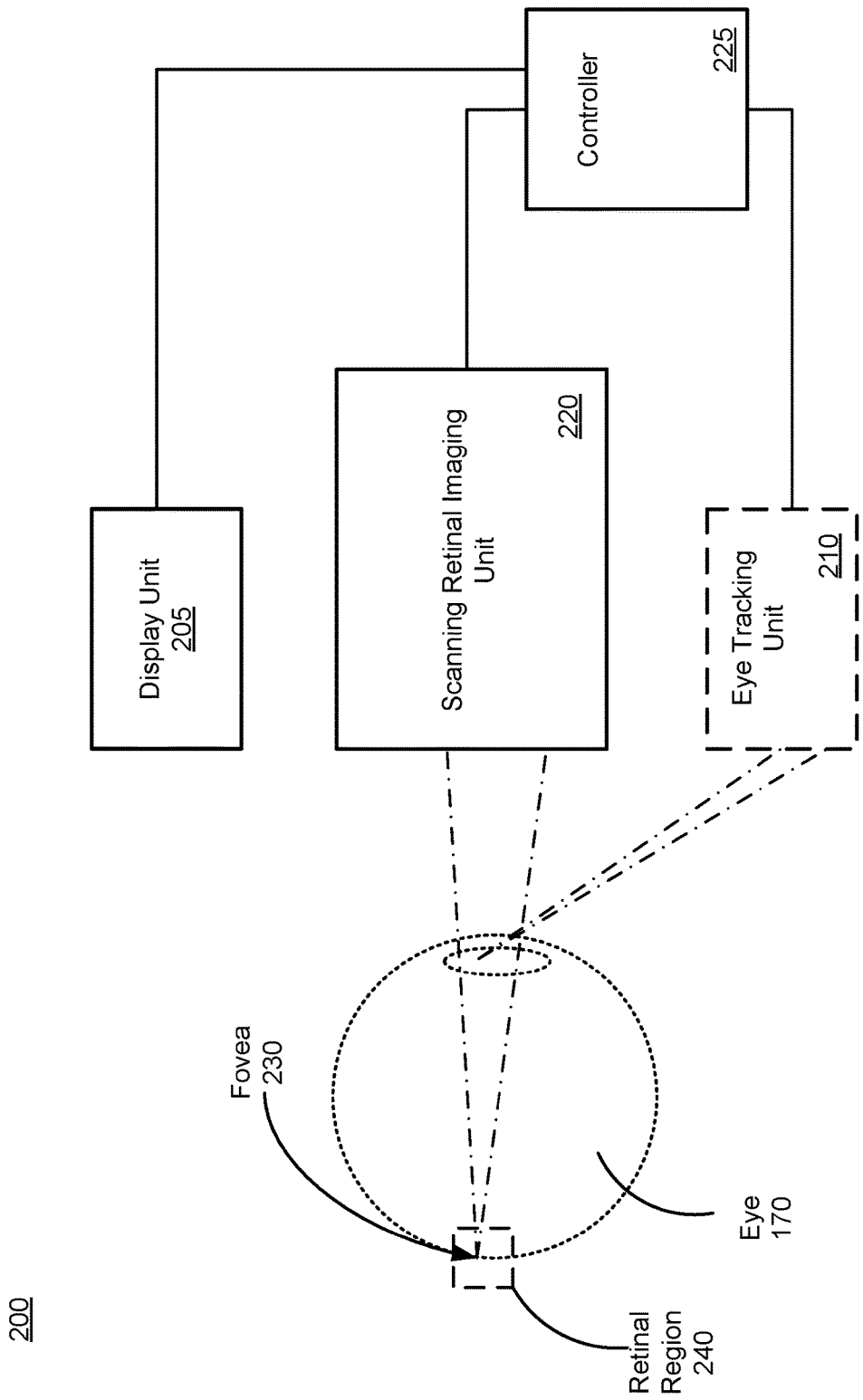
FIG. 2 is a high-level block diagram illustrating an embodiment of an eye tracker characterization system for characterizing performance of an eye tracking unit under test, in accordance with an embodiment.

FIG. 2 is a high-level block diagram illustrating an embodiment of an eye tracker characterization system 200, in accordance with an embodiment. The eye tracker characterization system 200 characterizes performance of an eye tracking unit 210 under test. The eye tracker characterization system 200 includes a display unit 205, a scanning retinal imaging unit 220 and a controller 225. The eye tracker characterization system 200 is configured to characterize performance of the eye tracking unit 210 that may be later incorporated through a fabrication process into a HMD, e.g., the HMD 100 in FIG. 1A. The eye tracking unit 210 is simply the eye tracking unit 175 coupled to the eye tracker characterization system 200 for characterization.

The display unit 205 projects content onto a retina of the eye 170. In some embodiments, the display unit 205 may include an electronic display (not shown in FIG. 2) and an optics block (not shown in FIG. 2). In some embodiments, the electronic display is one of the embodiments of the electronic display 155 in FIG. 1B. The optics block is one of the embodiments of the optics block 160 in FIG. 1B. The display unit 205 may display one or more test patterns to the eye 170. A test pattern may include a grid of visual objects, a single visual object, multiple visual objects that are displayed at several locations (e.g., corners, centers, other suitable locations affecting estimation of eye's positions, or some combination thereof) on the electronic display. As the user gazes at each location of the visual objects, the user's eye 170 is positioned in a corresponding eye position, both the eye tracking unit 210 and the scanning retinal imaging unit 220 determine a corresponding eye position for each visual object as further described below.

In some embodiments, the display unit 205 generates content by modulating light beam emitted from a light source and delivers the generated content to a retinal region 240 having a fovea 230 directly without using an electronic display. The display unit 205 may include a light source configured to emit a light beam, a modulator configured to generate content by modulating the emitted light beam and an optics assembly configured to deliver the generated content to the retinal region 240. Examples of a light source may include: a super luminescent diode (SLD), a tunable wavelength laser (e.g., Ti: sapphire laser, Cr: Forsterite laser), a light emitted diode (LED), a short pulse laser (e.g., a laser diode), an ASE (Amplified Spontaneous Emission) light source, a fiber light source (e.g., photonic crystal fiber, Yb-doped fiber, Er-doped fiber, Tm-doped fiber), a vertical-cavity surface-emitting laser (VCSEL), or a light source having a narrow wavelength bandwidth (e.g., approximate 50 nanometers). Examples of a modulator may include an acousto-optic modulator (AOM), an electrically addressed spatial light modulator (e.g., digital micromirror device, ferroelectric liquid crystals, or nematic liquid crystals), and an optically addressed spatial light modulator (e.g., liquid crystals). In one embodiment, the display unit 205 generates content by modulating amplitudes of light emitted from the light source. For example, the display unit 205 generates content in a negative contrast (e.g., the light source is switched off to write the content onto the retinal region 240) within dim field created by the light source. The optics assembly may include a plurality of optical elements to deliver the content to the retinal region 240. Examples of optical elements may include an aperture, a spherical mirror, a Fresnel lens, a convex lens, a concave lens, a filter, adaptive optics (e.g., a wavefront sensor, deformable mirror), or any other suitable optical element that delivers content to the retinal region 240. In some embodiments, one or more of the optical elements in the optics assembly may have one or more coatings, such as partial reflectors or anti-reflective coatings. In some embodiments, one or more optical element may be designed to correct one or more types of optical error. In one embodiment, the display unit 205 may use the same light source and the same optical elements between the light source and the retinal region 240 as ones used in the scanning retinal imaging unit 220, as further described with respect to FIG. 4.

The eye tracking unit 210 determines eye tracking information based on light reflected and/or scattered from the eye 170 (e.g., the eye's sclera or cornea surface, or a limbus). In some embodiments, the eye tracking 210 determines eye tracking information based on content displayed by the display unit 205. The eye tracking unit 210 may use the eye tracking information to further estimate eye tracking values, such as a gaze direction, a gaze position, a vergence angle, an IPD, a pupillary axis, a torsion of the eye 170, a current shape of the eye 170, some other function based on position of one or both eyes, or some combination thereof. Determined eye tracking values can then be included in the eye tracking information. The eye tracking unit 210 provides eye tracking information and/or estimated eye tracking values to the controller 225 for characterization.

The scanning retinal imaging unit 220 generates eye tracking parameters as ground truth based on captured light information of the user's retinal region 240 to characterize eye tracking information determined by the eye tracking unit 210. An eye tracking parameter characterizes a function that is based in part on a position (may include orientation) of at least one of the user's eyes. Examples of an eye tracking parameter may include a position of the eye 170, an orientation of the eye 170, a gaze direction, a gaze position, a vergence angle, an IPD, a pupillary axis, a torsion of the eye 170, a current shape of the eye 170, some other function based on position of one or both eyes, or some combination thereof.

The scanning retinal imaging unit 220 may include one or more light sources (not shown in FIG. 2), a scanning optics assembly (not shown in FIG. 2), and one or more detectors (not shown in FIG. 2). Additionally, the scanning retinal imaging unit 220 may include a plurality of optical elements to direct light emitted from the light source to the retinal region 240 and to direct light reflected and/or scattered from the retinal region 240 to the detector. In some embodiments, the scanning retinal imaging unit 220 may include adaptive optics (e.g., a deformable mirrors, a wavefront sensor, or a liquid crystal array) to remove optical aberrations during light propagation between the light source and the detector. An example of a scanning retinal imaging unit 220 with adaptive optics may be an adaptive optics scanning laser ophthalmoscopy.

A light source of the scanning retinal imaging unit 220 illuminates a retinal region having a fovea (e.g., the retinal region 240). The size of the illuminated retinal region may depend on diffraction limited performance of the scanning retinal imaging unit 210. For example, the size of the illuminated retinal region is within a threshold to maintain that spots distributed on the illuminated retinal region captured by the detector are well within an Airy disc. In one embodiment, the size of the illuminated retinal region may be smaller than an 8 degree field of view (FOV). The light source may be an infrared light source. Examples of infrared light sources may include: a super luminescent diode (SLD), a tunable wavelength laser (e.g., Ti: sapphire laser, Cr: Forsterite laser), a light emitted diode (LED), a short pulse laser (e.g., a laser diode), an ASE (Amplified Spontaneous Emission) light source, a fiber light source (e.g., photonic crystal fiber, Yb-doped fiber, Er-doped fiber, Tm-doped fiber), a vertical-cavity surface-emitting laser (VCSEL), or a light source having a narrow wavelength bandwidth (e.g., approximate 50 nanometers). In some embodiments, a light source may be coupled to a modulator (e.g., AOM) to modulate power of the light beam emitted from the light source.

The scanning optics assembly is configured to scan the light beam emitted from the light source over the retinal region 240. The scanning optics assembly varies a focused position of light beam on the retinal region 240 via steering the light beam emitted from the light source over the retinal region 240. Examples of scanning optics assembly may include a resonant mirror, a galvanometer mirror, MEMS (Micro-Electro-Mechanical Systems)-based deformable mirror, a piezoelectric deformable mirror, a movable mirror, other suitable optical element that steers the light beam emitted from the light source, or some combination thereof. The scanning optics assembly may perform various type of scanning. Examples of a type of scanning may include raster scanning, sawtooth scanning, or other suitable scanning that steers the light beam in a controlled scanning.

A detector detects light reflected and/or scattered from the illuminated retinal region 204. Examples of the detector may include a photodiode, a balanced/matched photodiodes, avalanche photodiode, a photomultiplier tube (PMT), a solid state detector, other suitable detector based on a single point detection, a still camera, a video camera, a linear photodiode array, a charge-coupled device (CCD) array, a complementary metal-oxide semiconductor (CMOS) array, or other suitable detector based on one or two-dimensional detector arrays. In some embodiments, a pinhole may be placed at a retinal conjugate plane prior to the detector for rejecting light reflected and/or scattered from out-of-focus positions on the retinal region 240. An example of a scanning retinal imaging unit 220 with one or more pinholes to reject out-of-focus light may be a confocal scanning laser ophthalmoscopy.

The scanning retinal imaging unit 220 determines eye tracking parameters based on captured light from the detector. In some embodiments, the scanning retinal imaging unit 220 may compare captured light information (e.g., captured images of the retinal region 240) with a predetermined lookup table or a predetermined eye model to determine eye tracking parameters of the eye 170. A predetermined lookup table or a predetermine eye model describes the relation between captured light information and eye tracking parameters. For example, the scanning retinal imaging unit 220 identifies captured fovea 230 in a captured image of the retinal region 240, and determines eye tracking parameters based on a comparison between shapes and/or locations of the identified captured fovea 230 and a predetermined look-up table (or a predetermined eye model). In some embodiments, scanning retinal imaging unit 220 determines eye tracking parameters based on content displayed by the display unit 205. The scanning retinal imaging unit 220 provides eye tracking parameters to the controller 225 for characterizing the eye tracking unit 210.

The controller 225 is configured to characterize the eye tracking unit 210 based on a comparison between eye tracking information and/or estimated eye tracking values provided by the eye tracking unit 210 and corresponding eye tracking parameters provided by the scanning retinal imaging unit 220. The controller 225 may be coupled to the display unit 205, the eye tracking unit 210, and the scanning retinal imaging unit 220. The controller 225 may control operations of the display unit 205, the eye tracking unit 210, and the scanning retinal imaging unit 220. In one embodiment shown in FIG. 2, the controller 225 is implemented as a module separate of the scanning retinal imaging unit 220 such that the controller 225 interfaces the display unit 205, the eye tracking unit 210, and the scanning retinal imaging unit 220. In an alternate embodiment (not shown in FIG. 2), the controller 225 is incorporated into the scanning retinal imaging unit 220 and controller 225 is also coupled to the display unit 205 and the eye tracking unit 210.

The controller 225 generates an instruction to instruct the display unit 205 to project content onto the eye 170. In some embodiments, the generated instruction to instruct the display unit 205 having an electronic display may include selecting content (e.g., one or more test patterns) to be projected, or other suitable instruction to instruct the display unit 205 to perform one or more actions. In some embodiments, the generated instruction to instruct the display unit 205 having a light source and a modulator may include selecting a retinal region to be illuminated, selecting a wavelength of the light source, instructing the light source to illuminate the selected retinal region, selecting a setting (e.g., modulation frequency, modulation magnitude, a setting to switch the light source off, a setting to switch the light source on, a setting to adjust a power of the light source, or other suitable setting to modulate light beam) for the modulator to modulate light, or other suitable instruction to instruct the display unit 205 to perform one or more actions, or some combination thereof.

The controller 225 generates instructions to activate both the eye tracking unit 210 under test and the scanning retinal imaging unit 220. The generated instruction to activate the eye tracking unit 210 may include selecting a portion (e.g., a sclera or cornea surface) of the eye 170 to be illuminated, instructing the illuminator to illuminate the selected portion, instructing the imaging device to detect light reflected and/or scattered from the illuminated portion, instructing the eye tracking controller to determine eye tracking information and/or to estimate eye tracking values, instructing the eye tracking controller to select eye tracking information (e.g., a position of the eye 170), instructing the eye tracking controller to provide the selected eye tracking information to the controller 225, instructing the eye tracking controller to select one or more estimated eye tracking values, instructing the eye tracking controller to provide the selected estimated eye tracking values to the controller 225, or other suitable instruction to instruct the eye tracking unit 210 to perform one or more actions, or some combination thereof.

The generated instruction to activate the scanning retinal imaging unit 220 may include selecting a retinal region (e.g., the retinal region 240) having the fovea 230 of the eye 170 to be illuminated, instructing the light source to illuminate the selected retinal region, instructing the scanning optics assembly to select a type of scanning, instructing the scanning optics assembly to use the selected type of scanning to scan the light beam emitted from the light source over the selected retinal region, instructing the detector to detect light reflected and/or scattered from the illuminated retinal region, instructing the scanning retinal imaging unit 220 to determine eye tracking parameters, instructing the scanning retinal imaging unit 220 to select one or more eye tracking parameters, instructing the scanning retinal imaging unit 220 to provide the selected eye tracking parameters to the controller 225, or other suitable instruction to instruct the scanning retinal imaging unit 220 to perform one or more actions, or some combination thereof.

In some embodiments, the controller 225 receives user input to generate instructions to instruct the eye tracking unit 210 and the scanning retinal imaging unit 220. For example, the user may input eye tracking information, and/or estimated eye tracking values to be characterized. The controller 225 may generate instruction to instruct the eye tracking unit 210 to provide eye tracking information, and/or estimated eye tracking values to be characterized. The controller 225 may generate instruction to instruct the scanning retinal imaging unit 220 to provide corresponding eye tracking parameters.

The controller 225 receives the eye tracking information and/or estimated eye tracking values from the eye tracking unit 210, and receives the eye tracking parameters from the scanning retinal imaging unit 220. The controller 225 selects eye tracking information and/or estimated eye tracking values and selects corresponding eye tracking parameters for comparison. For example, the controller 255 selects an eye's position from the received eye tracking information and selects an eye's position from the received eye tracking parameters for comparison. In another example, the controller 225 selects a gaze direction from the received estimated eye tracking values and selects a gaze direction from the received eye tracking parameters for comparison.

The controller 225 calculates differences between each of the selected eye tracking information and/or estimated eye tracking values and each of corresponding selected eye tracking parameters. The controller 225 characterizes each of the selected eye tracking information and/or estimated eye tracking values based on the calculated differences. In some embodiments, the controller 225 determines a quality value to check how close a selected eye tracking information and/or estimated eye tracking value is to a corresponding eye tracking parameter. If the quality value indicates that a difference between a selected eye tracking information and/or estimated eye tracking value and a corresponding eye tracking parameter is within an acceptable range (e.g., within a threshold value of the corresponding eye tracking parameter), the controller 225 indicates that the selected eye tracking information and/or estimated eye tracking value is acceptable. If the quality value indicates that a selected eye tracking information and/or estimated eye tracking value deviates from a corresponding eye tracking parameter more or less than an associated threshold, the controller 225 indicates the selected eye tracking information and/or estimated eye tracking value fails. The threshold value can be the same or different for different eye tracking parameters. In some embodiments, the controller 225 may generate a report and provide the report to the user. The report may include a list of selected eye tracking information and/or estimated eye tracking values, a list of corresponding selected eye tracking parameters, a list of calculated differences between each of the selected eye tracking information and/or estimated eye tracking values and each of the corresponding eye tracking parameters, a list of quality values associated with each of the selected eye tracking information and/or estimated eye tracking values, or some combination thereof.

Figure 3:
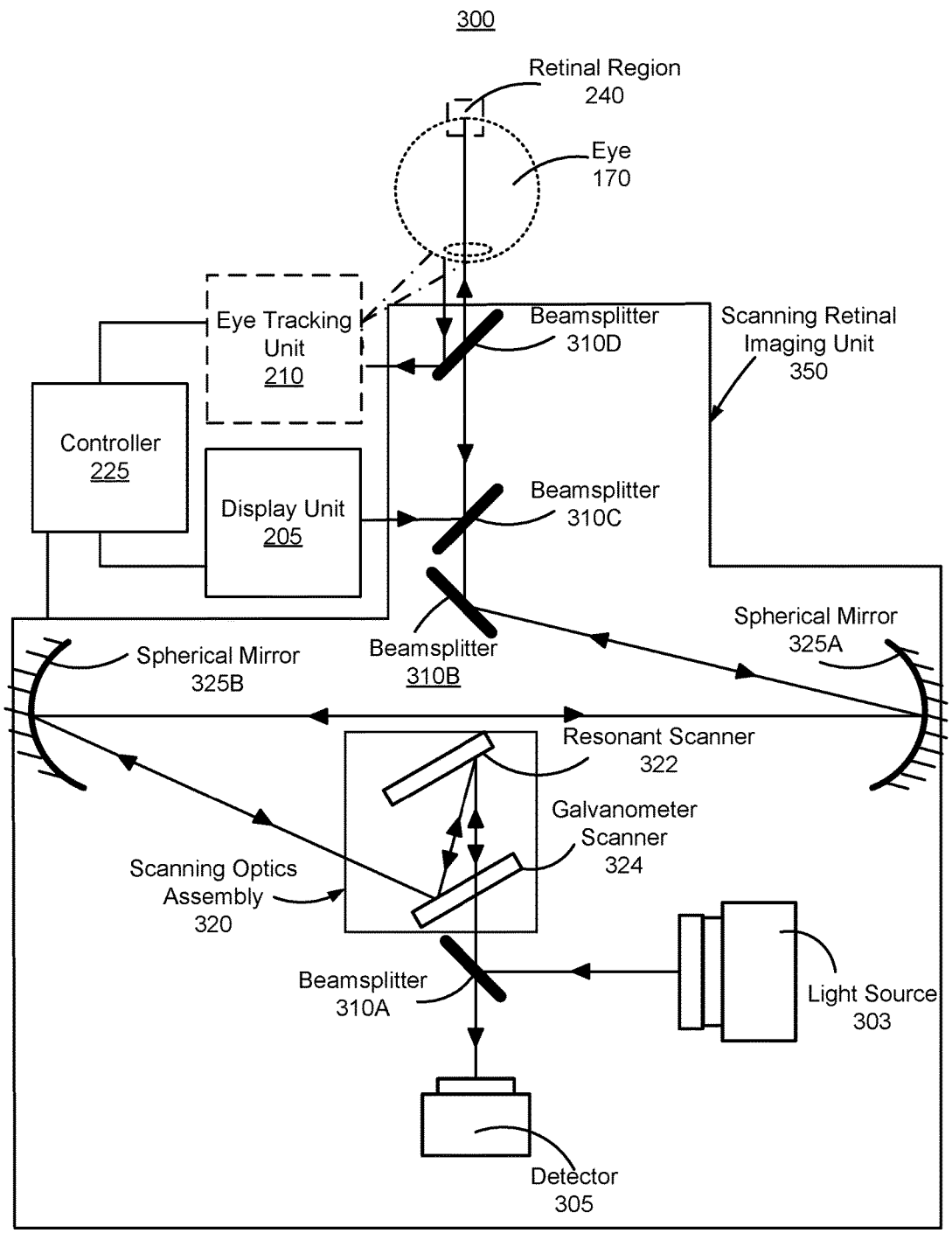
FIG. 3 is an example of an eye tracker characterization system for characterizing performance of an eye tracking unit under test, in accordance with an embodiment.

FIG. 3 is an example of an eye tracker characterization system 300 for characterizing performance of an eye tracking unit 210 under test, in accordance with an embodiment. The eye tracker characterization system 300 is an embodiment of the eye tracker characterization system 200. As shown in FIG. 3, the eye tracker characterization system 300 includes a display unit 205, an eye tracking unit 210, a scanning retinal imaging unit 350, and a controller 225. The scanning retinal imaging unit 350 is an embodiment of the scanning retinal imaging unit 220.

The controller 225 generates an instruction to instruct the display unit 205 to project content onto the eye 170. As shown in FIG. 3, beamsplitters 310C and 310D direct content generated by the display unit 205 to the eye 170. The controller 225 generates instructions to activate the eye tracking unit 210 under test and the scanning retinal imaging unit 350. As shown in FIG. 3, based on the instruction received from the controller 225, the eye tracking unit 210 illuminates a portion (e.g., surface of a cornea) of the eye 170 and capture light reflected from the illuminated portion of the eye 170.

As shown in FIG. 3, the scanning retinal imaging unit 350 includes a light source 303, a detector 305, beamsplitters 310A-310C, a scanning optics assembly 320 having a resonant scanner 322 and a galvanometer scanner 324, and spherical mirrors 325A and 325B. The resonant scanner 322 is configured to vary a focused position of the emitted light along a horizontal direction (e.g., along x-axis in a Cartesian coordinate system). The galvanometer scanner 324 is configured to vary a focused position of the emitted light along a vertical direction (e.g., along y-axis in a Cartesian coordinate system). In the example of FIG. 3, the controller 225 instructs the scanning optics assembly 320 to perform a raster scanning. Based on the instruction received from the controller 225, the light source 303 emits light (e.g., infrared light) to the scanning optics assembly 320 via the beamsplitter 310A. The scanning optics assembly 320 steers the light beam emitted from the light source via a raster scanning approach. A light beam outputted from the scanning optics assembly 320 is reflected by the spherical mirror 325A to form parallel light. The parallel light is focused by the spherical mirror 325B and directed, via beamsplitters 310C and 310D, to illuminate a focused spot of the retinal region 240. Light reflected and/or scattered from the focused spot is directed to the spherical mirror 325B via the beamsplitters 310C and 310D. The reflected and/or scattered light is reflected by the spherical mirror 325B to form parallel light and is focused on the scanning optics assembly 320 by the spherical mirror 325A. The light is directed to the detector 305 through the scanning optics assembly 320 and the beamsplitter 310A.

In some embodiments, an imaging optics (e.g., an imaging lens) (not shown in FIG. 3) and/or a pinhole (not shown in FIG. 3) may be placed between the beamsplitter 310A and the detector 305. The pinhole is configured to reject out-of-focus light reflected from the retinal region 240. The imaging lens placed between the pinhole and the detector 305 is configured to focus the in-focus light reflected from the retinal region 240 onto the detector 350.

Figure 4:
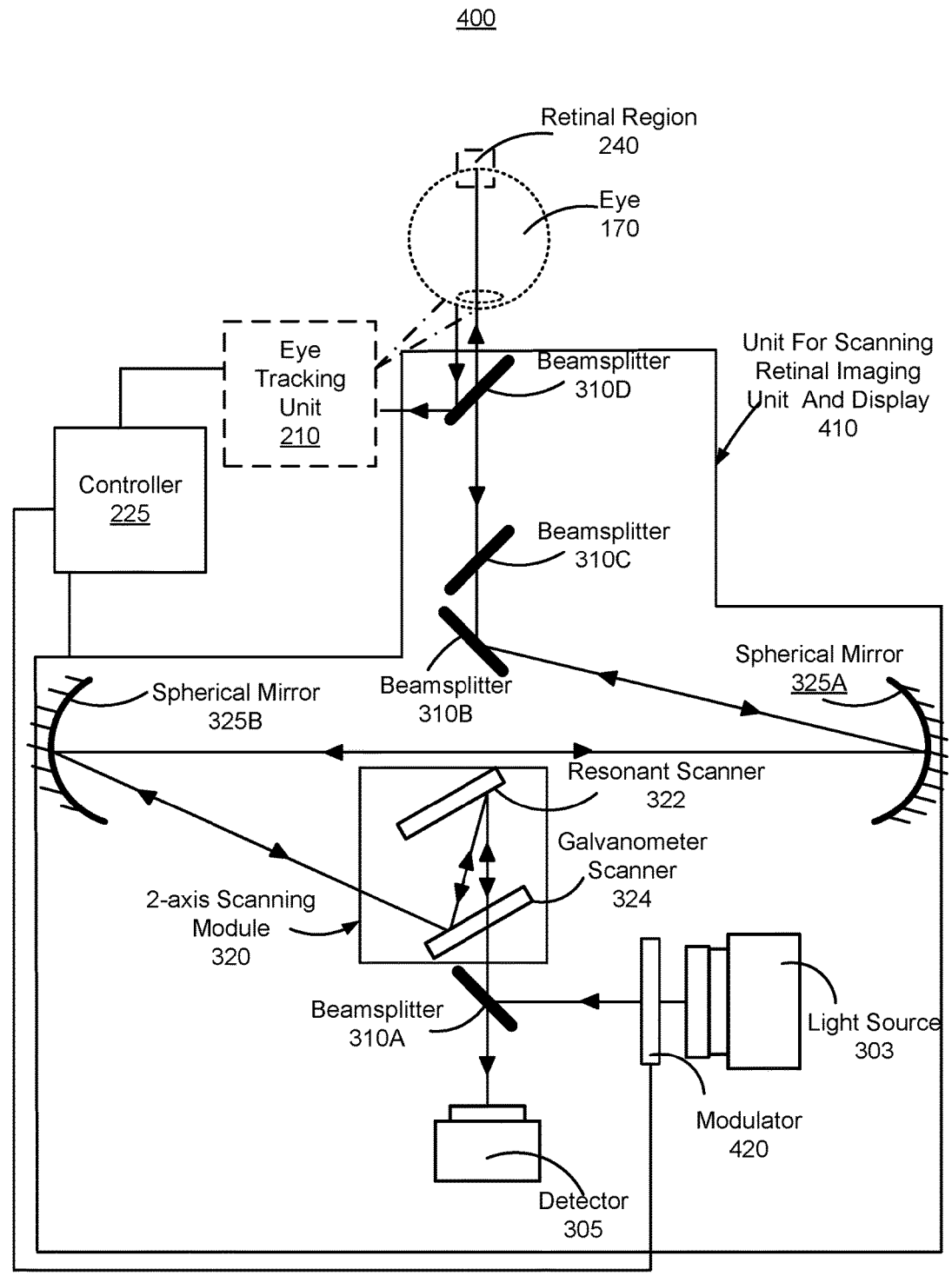
FIG. 4 is another example of an eye tracker characterization system for characterizing performance of an eye tracking unit under test, in accordance with an embodiment.

FIG. 4 is another example of an eye tracker characterization system 400 for characterizing performance of an eye tracking unit 210 under test, in accordance with an embodiment. The eye tracker characterization system 400 is similar to the eye tracker characterization system 200 except, for example, among other differences, it does not include a display unit 205. Additionally, in FIG. 4, the light source 303 is configured to emit light in a visible band as well as light in an infrared band. As shown in FIG. 4, the eye tracker characterization system 400 includes a unit 410 for scanning retinal imaging and display, an eye tracking unit 210, and a controller 225. Compared with the scanning retinal imaging unit 350 in FIG. 3, the unit 410 for scanning retinal imaging and display has additional modulator 420. For imaging the retinal region 240, the modulator 420 performs a first function to modulate power of the light emitted from the light source 303. For projecting content to the retinal region 240, the modulator 420 performs a second function to generate content by modulating amplitude, frequency of the light emitted from the light source 303. To switch between scanning retinal imaging and display, the controller 225 generates an instruction to instruct the modulator 420 to perform a corresponding function. For example, the controller 225 generates an instruction to instruct the first function for scanning retinal imaging, in which the light source 303 emits infrared light. The controller 225 generates an instruction to instruct the second function for projecting content onto the retinal region 240, in which the light source 303 emits visible light.

FIG. 5 is a flowchart illustrating a process 500 of characterizing performance of an eye tracking unit under test using an eye tracker characterization system, in accordance with an embodiment. The eye tracking unit under test may be later incorporated into a HMD (e.g., the HMD 100 shown in FIG. 1A). The process 500 of FIG. 5 may be performed by the eye tracker characterization system 200. Other entities may perform some or all of the steps of the process in other embodiments. Likewise, embodiments may include different and/or additional steps, or perform the steps in different orders.

The eye tracker characterization system 200 instructs 510 a display unit to project content onto a user's eye. For example, the eye tracker characterization system 200 generates an instruction to instruct the display unit to select one or more test patterns (e.g., a test pattern having a grid of visual objects, a test pattern having a single visual object, or a test pattern having multiple visual objects) to be projected and to instruct the display unit to project the selected test pattern onto the user's eye. In another example, the eye tracker characterization system 200 generates an instruction to instruct the display unit to modulate light emitted from a light source for generating content to be projected, and to instruct the display unit to project the generated content on the user's retina.

The eye tracker characterization system 200 activates 520 an eye tracking unit under test and a scanning retinal imaging unit. For example, the eye tracker characterization system 200 generates an instruction to activate the eye tracking unit. The eye tracker characterization system 200 generates an instruction to instruct the eye tracking unit to illuminate a portion (e.g., surface of a cornea) of the eye, to capture light reflected from the illuminated portion of the eye, to determine eye tracking information (and/or eye tracking values), and to provide eye tracking information t (and/or eye tracking values) to a controller. The eye tracker characterization system 200 generates an instruction to activate the scanning retinal imaging unit. The eye tracker characterization system 200 generates an instruction to instruct the scanning retinal imaging unit to illuminate a retinal region having a fovea (e.g., the retinal region 240), to scan the light beam emitted from a light source over the retinal region, to capture light reflected from the illuminated retinal region, to determine eye tracking parameters, and to provide eye tracking parameters to a controller.

The eye tracker characterization system 200 selects 530 eye tracking information received from the eye tracking unit and corresponding eye tracking parameters received from the scanning retinal imaging unit. For example, the eye tracker characterization system 200 selects an eye's position from the received eye tracking information. Accordingly, the eye tracker characterization system 200 selects an eye's position from the received eye tracking parameters for comparison.

The eye tracker characterization system 200 calculates 540 differences between each of the selected eye tracking information and each of corresponding selected eye tracking parameters. For example, the eye tracker characterization system 200 determines a quality value to check how close a selected eye tracking information is to a corresponding eye tracking parameter.

The eye tracker characterization system 200 characterizes 550 each of the selected eye tracking information based on the calculated differences. For example, if the quality value indicates that a difference between a selected eye tracking information and a corresponding eye tracking parameter is within an acceptable range, the eye tracker characterization system 200 indicates that the selected eye tracking information is acceptable. If the quality value indicates that a selected eye tracking information deviates from a corresponding eye tracking parameter more or less than an associated threshold, the eye tracker characterization system 200 indicates the selected eye tracking information fails. In another example, the eye tracker characterization system 200 may generate a report and provide the report to the user.

ADDITIONAL CONFIGURATION INFORMATION

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An eye tracker characterization system comprising:
 a scanning retinal imaging unit configured to characterize eye tracking information determined by an eye tracking unit under test, the scanning retinal imaging unit including:
  a scanning optics assembly configured to scan light in a first band across a retinal region of an eye of a user, and a detector configured to detect the scanned light reflected from the retinal region; and a controller coupled to the eye tracking unit under test and the scanning retinal imaging unit, the eye tracking unit under test comprising an illumination source, an imaging device and an eye tracking controller, the controller configured to:

instruct the illumination source of the eye tracking unit under test to illuminate at least one surface of the eye, instruct the scanning retinal imaging unit to illuminate the retinal region, receive, from the eye tracking unit under test, the eye tracking information related to the at least one surface, receive an eye tracking parameter from the scanning retinal imaging unit, compare the eye tracking information and the eye tracking parameter, and characterize the eye tracking information based on the comparison.

2. The eye tracker characterization system of claim 1, further comprising:

a light source configured to emit the light in the first band and light in a second band in accordance with instructions from the controller, and a modulator configured to modulate, in accordance with instructions from the controller, the light in the second band emitted from the light source, and wherein the controller is further configured to instruct the light source to emit the light in the second band and instruct the modulator to modulate the emitted light in the second band to generate content that is projected onto the retinal region of the eye.

3. The eye tracker characterization system of claim 1, wherein the eye tracking parameter is selected from a group consisting of: a position of the eye, an orientation of the eye, a gaze direction, a gaze position, a vergence angle, an inter-pupillary distance, a pupillary axis, a torsion of the eye, and a current shape of the eye.

4. The eye tracker characterization system of claim 1, wherein the eye tracking information describes a position of the eye.

5. The eye tracker characterization system of claim 1, wherein the controller is further configured to:

determine a quality value for the eye tracking information, based in part on the comparison; and indicate acceptability of the eye tracking parameter based in part on the quality value.

6. The eye tracker characterization system of claim 1, wherein the scanning optics assembly comprises:

a resonant scanner configured to vary a focused position of the light in the first band along a first direction; and a galvanometer scanner configured to vary a focused position of the light in the first band along a second direction that is orthogonal to the first direction.

7. The eye tracker characterization system of claim 1, wherein the eye tracking unit under test with the characterized eye tracking information is incorporated into a head-mounted display.

8. The eye tracker characterization system of claim 1, further comprising:

a display configured to emit content that is projected onto the retinal region of the eye, the content including a visual object.

9. The eye tracker characterization system of claim 8, wherein the eye tracking information determined by the eye tracking unit under test describes a position for the eye gazing at the visual object, and the eye tracking parameter corresponds to an eye position.

10. A method comprising:

instructing a scanning optics assembly of a scanning retinal imaging unit to scan light in a first band across a retinal region of an eye of a user;

detecting, by a detector of the scanning retinal imaging unit, the scanned light reflected from the retinal region;

instructing an illumination source of an eye tracking unit under test to illuminate at least one surface of the eye;

receiving, from the eye tracking unit under test, the eye tracking information related to the at least one surface;

receiving an eye tracking parameter from the scanning retinal imaging unit;

comparing the eye tracking information and the eye tracking parameter; and characterizing the eye tracking information based on the comparison.

11. The method of claim 10, further comprising:

emitting, by a light source, the light in the first band and light in a second band in accordance with instructions from the controller; and modulating the light in the second band emitted from the light source to generate content that is projected onto the retinal region of the eye.

12. The method of claim 10, wherein the eye tracking parameter is selected from a group consisting of: a position of the eye, an orientation of the eye, a gaze direction, a gaze position, a vergence angle, an inter-pupillary distance, a pupillary axis, a torsion of the eye, and a current shape of the eye.

13. The method of claim 10, further comprising:

determining a quality value for the eye tracking information, based in part on the comparison; and indicating acceptability of the eye tracking parameter based in part on the quality value.

14. The method of claim 10, further comprising:

varying a focused position of the light in the first band along a first direction; and varying a focused position of the light in the first band along a second direction that is orthogonal to the first direction.

15. The method of claim 10, further comprising:

emitting content from a display; and projecting the emitted content onto the retinal region of the eye, the content including a visual object.

16. The method of claim 15, wherein the eye tracking information describes a position for the eye gazing at the visual object, and the eye tracking parameter corresponds to an eye position.

17. A non-transitory computer-readable medium storing instructions which, when executed by one or more processors, cause the one or more processors to perform operations comprising:

instructing a scanning optics assembly of a scanning retinal imaging unit to scan light in a first band across a retinal region of an eye of a user;

detecting, by a detector of the scanning retinal imaging unit, the scanned light reflected from the retinal region;

instructing an illumination source of an eye tracking unit under test to illuminate at least one surface of the eye;

receiving, from the eye tracking unit under test, the eye tracking information related to the at least one surface;

receiving an eye tracking parameter from the scanning retinal imaging unit;

comparing the eye tracking information and the eye tracking parameter; and characterizing the eye tracking information based on the comparison.

18. The computer-readable medium of claim 17, wherein the instructions cause the one or more processors to perform further operations, comprising:
emitting content from a display; and
projecting the emitted content onto the retinal region of the eye, the content including a visual object.

19. The computer-readable medium of claim 17, wherein the instructions cause the one or more processors to perform further operations, comprising:
emitting, by a light source, the light in the first band and light in a second band in accordance with instructions from the controller, and
modulating the light in the second band emitted from the light source to generate content that is projected onto the retinal region of the eye.

20. The computer-readable medium of claim 17, wherein the instructions cause the one or more processors to perform further operations, comprising:
determining a quality value for the eye tracking information, based in part on the comparison; and
indicating acceptability of the eye tracking parameter based in part on the quality value.

* * * * *